Sept. 4, 1956 H. E. RICE, JR 2,762,039
REFLECTION TYPE INDICATING DEVICES
Filed Sept. 22, 1953 2 Sheets-Sheet 1

INVENTOR
HENRY E. RICE, JR.
BY Elmer J. Gorn
ATTORNEY

Sept. 4, 1956  H. E. RICE, JR  2,762,039
REFLECTION TYPE INDICATING DEVICES
Filed Sept. 22, 1953  2 Sheets-Sheet 2

INVENTOR
HENRY E. RICE, JR.
BY Elmer J. Gorn
ATTORNEY

United States Patent Office

2,762,039
Patented Sept. 4, 1956

2,762,039

REFLECTION TYPE INDICATING DEVICES

Henry E. Rice, Jr., Concord, Mass., assignor to Raytheon Manufacturing Company, Newton, Mass., a corporation of Delaware Application September 22, 1953, Serial No. 381,576

6 Claims. (Cl. 340—368)

This invention relates to information plotting devices, and more particularly to information plotting devices used in conjunction with radar indicators.

It is well known that radar systems may be used for navigation and navigation control purposes. In general, such systems utilize a plan position indicator wherein a pattern appears on the face of a cathode ray tube indicating the position of surrounding targets in a map-like relationship to the radar station which is usually, but not necessarily, positioned at the center of the pattern.

In applications such as harbor navigational control systems, where it is desired to keep track of the courses of many moving objects, such as ships, it has been found advantageous to plot the positions of the ships periodically by hand in order to determine the courses of the ships from which, in turn, the probability of collision of any of the ships may be predicted in sufficient time to take precautionary measures.

A type of plotting board found to be convenient for this type of work is a reflection plotter comprising a transparent plate positioned above the face of the plan position indicator tube on which marks may be made, for example, with a red crayon. A half silvered mirror is positioned substantially equidistant between the surface of the transparent plate on which marks are made and the fluorescent coating of a cathode ray tube screen. The plate is edge-lighted so that light will travel inwardly through the plate and, upon passing the wax crayon marks on the surface, will be deflected downward to impinge on the half silvered mirror and be reflected back up to the observer's eyes in such a way that the wax crayon marks on the plate will appear in the half silvered mirror to be positioned below the half silvered mirror at substantially the same distance as the marks are actually above the mirror. As a result, the marks appear to be projected down onto the fluorescent screen. The projections of said marks seem to appear at substantially the same position on the screen viewed from a wide range of directions above the plate.

The inaccuracy of the reflection plotter produced by the curvature of the cathode ray tube is substantially eliminated by forming the plate on which the plotting marks are made with a curvature substantially equal to the curvature of the cathode ray tube face, said curvature being in an opposite direction from the curvature of the cathode ray tube face. The same result may be obtained by forming the half silvered mirror with the reverse of the curvature of the cathode ray tube face and making the face plate flat. This correction can be even more accurately made by means of a divergent lens positioned below the half silvered mirror and above the face of the cathode ray tube. When the face plate is edge-lighted, even with a plurality of light sources, there is uneven lighting of the plate due to the light from each source striking different points on the edge of the plate at different angles, with the result that varying amounts of light penetrate the plate, the rest being reflected. It has been found that this unequal distribution can be remedied by lighting the plate with a light source positioned within an opening completely within the outer edge of the plate, so that the light enters the plate normally in all directions, with the result that a uniform amount of light enters the plate in all directions. The light is further distributed within the plate by reflections from the supporting bezel.

In this type of indicator there has been a problem of illuminating a bearing dial positioned near the face of the cathode ray tube. This problem is solved in this invention by inscribing the bearing dial on the top of the face plate and masking it from the direct view of the operator so that he sees only its reflected image at an apparent position adjacent to the tube face. Inaccuracies in using the cursor lines, previously experienced in instruments of this sort due to parallax, are reduced in this invention by inscribing such lines on a transparent plate positioned above the mirror at such a distance that they are seen both directly and as a reflected image near the level of the phosphor screen, thus reducing the effects of parallax.

Other and further objects and advantages of this invention will be better understood from the following description taken in conjunction with the accompanying drawings in which.

Figure 1:
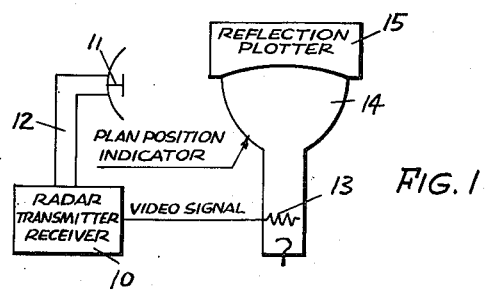
Fig. 1 is a block diagram of a radar system utilizing a plan position indicator having a reflection plotter attached thereto.
Figure 3:
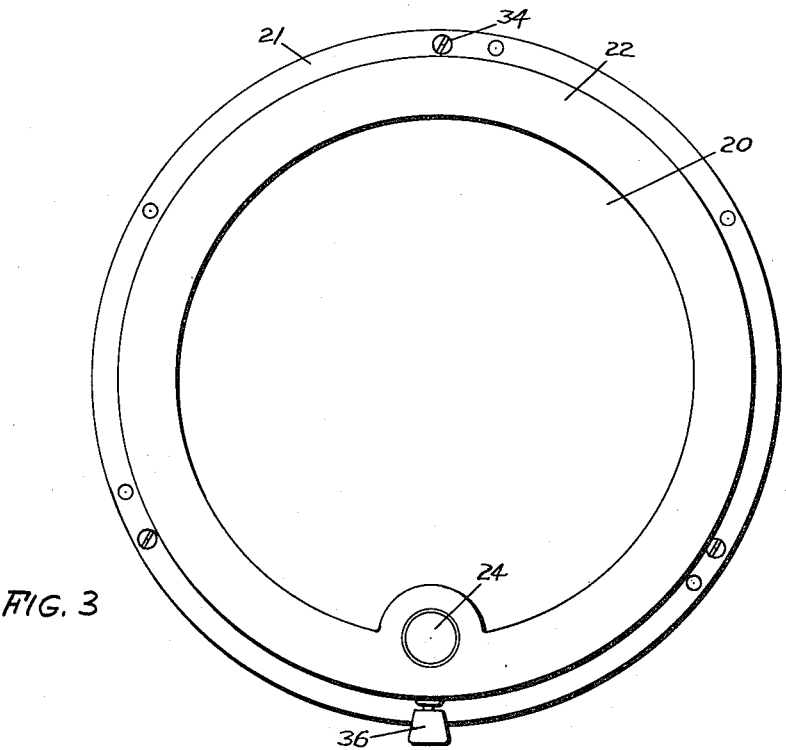
Fig. 3 illustrates a plan view of the reflection plotter illustrated in Fig. 2.

In Fig. 1, the reference numeral 10 designates a radar transmitter-receiver which may be of any desired type and which feeds signals to an antenna 11 by means of a transmission line 12. The signals are radiated from antenna 11 and impinge upon surrounding objects to produce reflected echo signals. The reflected echo signals are picked up by the antenna and pass down the transmission line to be detected by the radar transmitter-receiver 10. These signals are then fed in the form of video information to the control grid 13 of a cathode ray tube indicator 14. This cathode ray tube may be of any desired type employing well-known deflection and blanking circuits. In the particular embodiment illustrated herein, the cathode ray tube 14 is operated as a plan position indicator with the cathode ray being deflected radially outward from the center position at the repetition rate of the radar transmitter-receiver 10. The direction of the sweep is rotated synchronously with the rotation of the antenna 11 so that the presentation on the fluorescent screen of the cathode ray tube 14 is, in effect, a map showing the distance and direction of surrounding objects from the radar system. Positioned above the fluorescent screen of the cathode ray tube 14 is a reflection plotter 15 which may be used to plot the position of the surrounding objects.

Figure 2:
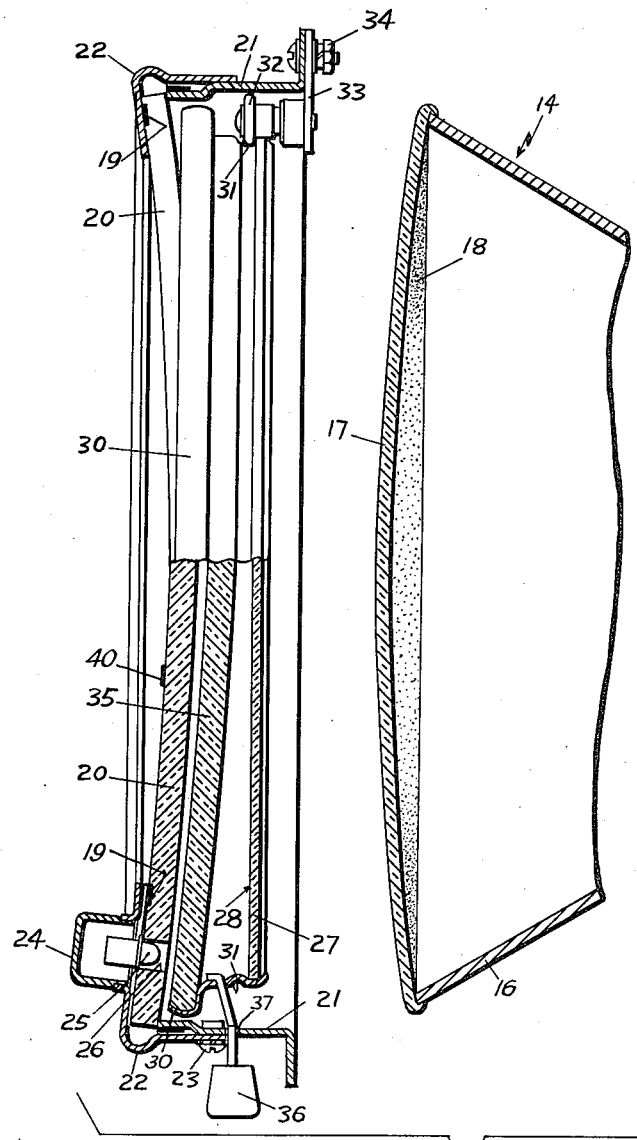
Fig. 2 illustrates a transverse cross-sectional view of a reflection plotter and a cathode ray tube wherein the plotting plate has equal and opposite curvature with respect to the face of the cathode ray tube.

In Fig. 2, the reflection plotter 15 is shown in greater detail, together with the cathode ray tube 14. This tube has a metal or glass container 16 to which is sealed a glass face plate 17 which bows out slightly. The inner surface of the glass face plate 17 is coated with fluorescent material represented by the stippled area 18, so that, when an electron beam strikes the surface, a bright spot will appear thereon in a well-known manner. Positioned beyond (to the left as shown in Fig. 2) the face plate 17 is a plate 20 of transparent material, such as plastic. The outer surface of plate 20 is bowed slightly in the direction of the tube 14 so that it has a radius of curvature substantially equal to the radius of curvature of the fluorescent screen 18. The plate 20 is supported in an annular metallic ring 21 about its outer edge to which is fastened a bezel 22 by screws 23. This bezel extends inwardly from the edge of the plate 20. This inwardly extending portion of the bezel 22 supports, within a cup 24, a lamp 25 that projects within an opening 26 near the edge of plate 20. The lamp 25 is shielded from an observer by the cup 24 and the inwardly extending portion of the bezel 22. Positioned between the plate 20 and the face 17 of the tube 14 is a plate 27, the outer surface of which has a partial coating 28 of reflecting material to form a half silvered mirror. This plate 27 is supported in an annular bezel 30. The outer surface of the bezel 30 is formed with a curved groove 31 into which at least three rollers 32 with curved surfaces fit. The rollers 32 are mounted on the ring 21 by brackets 33 and screws 34, and serve to support the bezel 30 within the ring 21. The plate 27 is supported so that the half silvered surface 28 is substantially equidistant from the fluorescent screen 18 and the upper curved surface of the plate 20. A second curved plate 35 is mounted in the bezel 30 on the same side of the plate 27 as the plate 20, and as close as possible to the plate 20. This plate 35 has the same curvature as the plate 20, and has a cursor marked on it. Degree marks 19 are inscribed on the outer surface of the plate 20 about its periphery and in such a position as to be masked from the direct view of the observer by the inwardly extending portion of the bezel 22. A handle 36 is attached to the bezel 30 and brought out through an elongated opening 37 in the ring 21 so that the bezel 30 may be rotated within the ring 21 on the rollers 32.

Figure 5:
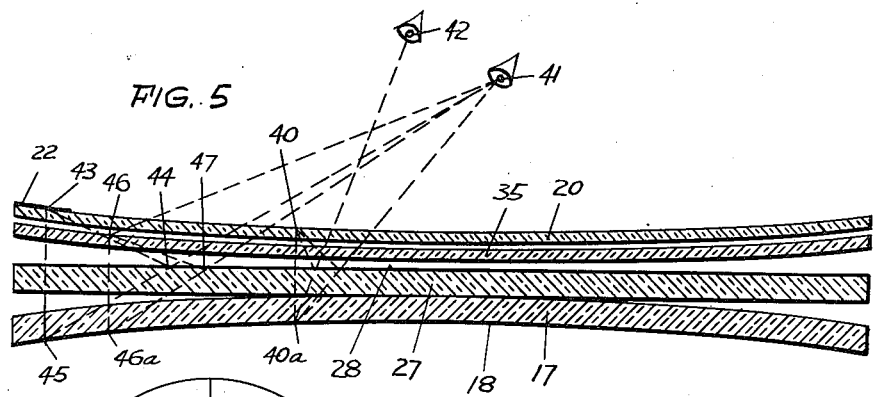
Fig. 5 is a diagram of a light path through the reflection plotter.
Figure 4:
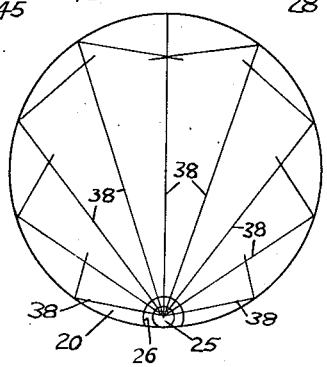
Fig. 4 is a diagram of the path of the light within the face plate.

The operation of the invention can best be understood with references to Figs. 4 and 5. In Fig. 4, the lamp 25 is shown mounted in an opening 26 near the edge of the plate 20. It will be seen that substantially all the rays 38 of light from the lamp 25 enter the plate 20 at the wall of the opening 26 radially and thus are not partly reflected and lost as would be the case if they entered at different angles to such a radial as would happen if the lamp were mounted beyond the edge of the plate 20. This arrangement affords a substantially even illumination of the plate 20. The distribution of the illumination within the plate 20 is aided by reflections from the inside of the bezel 22.

If a mark is made, for example, with a waxed crayon on the upper surface of the plate 20, as at a point 40 in Fig. 5, light from the lamp 25 passing through the plate 20 will be partially deflected downward upon reaching the mark 40. An observer with his eyes positioned above plate 20, for example, at a point 41, upon looking downward will see the reflection of the spot 40 on the half silvered surface 28; said reflected spot will appear to be superimposed upon the fluorescent screen 18 at a point 40a directly below the mark 40. If the observer moves his eyes to a different position, such as the point 42, the projection of the mark 40 will still appear directly below the mark 40 and will still appear to be superimposed upon the screen 18.

In addition, a degree marking appearing at a point 43 will be hidden from direct observation by the eye of an observer at the point 41 by the inwardly extending portion of the bezel 22. However, it is illuminated by light from the light 25 and some of this light is reflected by the mirror 28 at a point 44 to the observer's eye at the point 41 and the mark appears to be at a point 45 on the phosphor screen 18 of the cathode ray tube 14 directly below its actual position where it can be of the most use in determining the bearing of a target.

A cursor mark at a point 46 is seen directly by the eyes of an observer at point 41 and has a reflection from the point 47 in the mirror 28 where it appears to come from a point 46a on the phosphor surface 18 which is directly below the point 46.

As has been pointed out above, the same results can be obtained by making the face plate 20 and the cursor plate 35 flat, and forming the mirror 27 with the corrective curve. This corrective effect can be increased by inserting a corrective lens between the phosphor screen and the mirror, as shown in the copending application of William M. Hall, Serial No. 243,209, filed August 23, 1951 now Patent No. 2,717,995, dated September 13, 1955.

This invention is not limited to the particular details of construction, materials and processes described, as many equivalents will suggest themselves to those skilled in the art. It is, accordingly, desired that the appended claims be given a broad interpretation commensurate with the scope of the invention within the art.

What is claimed is:

1. An indicating device comprising a cathode ray tube having a fluorescent screen adapted to have a plan position indicating pattern thereon, means for super-imposing plotting marks on said screen comprising an image source oriented to produce an image on said screen, means for producing a second image on said screen comprising markings on the surface of a second screen rotatably mounted parallel to said image source and between it and the fluorescent screen and a partially reflecting surface positioned effectively equidistant between the image source and said fluorescent screen.

2. An indicating device comprising a cathode ray tube having a fluorescent screen adapted to have a plan position indicating pattern thereon, means for super-imposing reference and plotting marks on said screen comprising image sources oriented to produce images on said screen, means for producing additional images on said screen comprising markings on the surface of a second screen rotatably mounted parallel to said image sources and between them and the fluorescent screen, means for masking said reference marks from direct view from the side of the screen away from the fluorescent screen, and a partially reflecting surface positioned effectively equidistant between the image sources and said fluorescent screen.

3. An indicating device comprising a cathode ray tube having a fluorescent screen adapted to have a plan position indicating pattern thereon, means for super-imposing plotting marks on said screen comprising a transparent screen with a light source mounted within an opening near the edge of the said transparent screen oriented to produce an image on said fluorescent screen, means for producing a second image on said screen comprising markings on the surface of a second screen rotatably mounted parallel to said image source and between it and the fluorescent screen and a partially reflecting surface positioned effectively equidistant between the image source and said fluorescent screen.

4. An indicating device comprising a cathode ray tube having a fluorescent screen adapted to have a plan position indicating pattern thereon, means for super-imposing reference and plotting marks on said screen comprising a transparent screen with a light source mounted within an opening near the edge of the said transparent screen oriented to produce an image on said fluorescent screen, means for producing additional images on said screen comprising markings on the surface of a second screen rotatably mounted parallel to said image sources and between them and the fluorescent screen, means for masking said reference marks on said first-mentioned transparent screen from direct view from the side of the screen away from the fluorescent screen, and a partially reflecting surface positioned effectively equidistant between the image sources and said fluorescent screen.

5. An indicating device comprising a cathode ray tube having a fluorescent screen adapted to have a plan position-indicating pattern thereon, means for superimposing reference and plotting marks on said screen comprising image sources oriented to produce images on said screen, means for masking said reference marks from direct view from the side of the screen away from the fluorescent screen, and a partially reflecting surface positioned effectively equidistant between the image sources and said fluorescent screen.

6. An indicating device comprising a cathode ray tube having a fluorescent screen adapted to have a plan position-indicating pattern thereon, means for superimposing reference and plotting marks on said screen comprising a transparent screen with a light source mounted within an opening near the edge of such transparent screen oriented to produce images on said screen, means for masking said reference marks from direct view from the side of the screen away from the fluorescent screen, and a partially reflecting surface positioned effectively equidistant between the image sources and said fluorescent screen.

References Cited in the file of this patent

UNITED STATES PATENTS

| | | |
|---|---|---|
| 2,540,110 | Gall | Feb. 6, 1951 |
| 2,580,240 | Newman | Dec. 25, 1951 |
| 2,588,035 | O'Neil | Mar. 4, 1952 |
| 2,655,836 | Sherwin | Oct. 20, 1953 |